(12) United States Patent
Suetake et al.

(10) Patent No.: US 7,069,157 B2
(45) Date of Patent: Jun. 27, 2006

(54) HEAT SENSITIVE FLOW METER AND FUEL CONTROLLER

(75) Inventors: Naruki Suetake, Tokyo (JP); Kazuhiko Ootsuka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/822,791

(22) Filed: Apr. 13, 2004

(65) Prior Publication Data

US 2005/0109085 A1 May 26, 2005

(30) Foreign Application Priority Data

Nov. 7, 2003 (JP) ......................................... 2003-378733

(51) Int. Cl.
*G01F 1/00* (2006.01)

(52) U.S. Cl. ......................................................... 702/45

(58) Field of Classification Search .................... 702/45; 358/1.13; 123/743, 478, 198, 452, 689, 14, 123/687, 672; 73/204, 861, 117, 482, 202, 73/23; 315/209; 368/5; 290/14, 45; 323/223; 324/384, 169; 701/114; 257/723; 439/894; 374/144

See application file for complete search history.

(56) References Cited

U.S. PATENT DOCUMENTS

| 4,297,881 | A | * | 11/1981 | Sasayama et al. | ........ 73/204.14 |
| 4,359,991 | A | * | 11/1982 | Stumpp et al. | .............. 123/478 |
| 4,609,292 | A | * | 9/1986 | Asano et al. | ................. 374/144 |
| 4,672,847 | A | * | 6/1987 | Uchiyama et al. | ........ 73/204.19 |
| 2004/0025584 | A1 | * | 2/2004 | Akamatsu et al. | ........ 73/204.11 |
| 2004/0040377 | A1 | * | 3/2004 | Tanimoto et al. | ......... 73/204.15 |

FOREIGN PATENT DOCUMENTS

JP            62-36522 B2      8/1987

* cited by examiner

*Primary Examiner*—Michael Nghiem
*Assistant Examiner*—Tung Lau
(74) *Attorney, Agent, or Firm*—Sughrue Mion, PLLC

(57) ABSTRACT

Provided is a heat sensitive flow meter for measuring a flow rate of a fluid passing through a flow passage provided in an internal combustion engine, including: a filter (7) (constituted of a fixed resister (3) and a capacitor (4)) for inputting a flow rate signal Vin outputted from a flow rate measurement unit installed within the flow passage to subject the flow rate signal to a predetermined filter processing; and a selection unit (8) (constituted of a fixed resister (2), an operational amplifier (5), and a diode (6)) for comparing the flow rate signal Vin outputted from the flow rate detection unit and a filter signal Vf passed through the filter (7) to select the signal having a higher voltage as a new flow rate signal.

11 Claims, 9 Drawing Sheets

HEAT SENSITIVE FLOW METER AND FUEL CONTROLLER

BACKGROUND OF THE INVENTION

1. Field of the Invention

The present invention relates to a heat sensitive flow meter and a fuel controller using the same.

2. Related Background Art

In general, in a heat sensitive flow meter for measuring a flow rate of a fluid such as intake air of an internal combustion engine of an automobile or the like, it is known that a magnitude of an output signal of the flow meter does not show a proportional relationship (linear model) to the flow rate, but shows a non-linear relationship in which a rate of increase in the magnitude of the output signal of the flow meter is more slowly changed as the flow rate is further increased. At this time, it is known that in a case where in the heat sensitive flow meter, a response of the flow meter is delayed due to an influence of a large heat capacity of a flow rate detection unit, or an influence of a low-pass filter (hereinafter referred to as "LPF" for short) installed in an interface between the flow meter and a fuel controller, when an intake gas pulsation of an engine is generated, a mean flow rate calculated by the flow meter become less than an actual mean flow rate in cooperation with the above-mentioned non-linearlity of the output signal to the flow rate calculated from the flow meter.

For this reason, there is proposed a technique providing a delay means for, when a signal obtained from a flow rate detection unit is delayed, delaying an output signal in a direction of a decrease of a flow rate after discriminating the direction of decrease from the direction of increase of a flow rate (refer to JP 62-36522 B for example).

In JP 62-36522 B, an increase and a decrease in flow velocity are discriminated with a diode, causing a response to be more lagged when the flow velocity is decreased than when the flow velocity is increased.

That is to say, in one embodiment described in JP 62-36522 B, there is adopted a configuration that when a flow velocity is increased, a signal is transmitted without delaying a response, while when a flow velocity is decreased, a response is delayed on the basis of a time constant determined by a capacity of a capacitor and a resistance value of a resistor.

In addition, in another embodiment described in JP 62-36522, a signal transmission path when a flow velocity is increased and a signal transmission path when a flow velocity is decreased are changed over to each other in order to change a resistance constant thereby changing a time constant.

Since in the technique disclosed in JP 62-36522 B, the response is caused to be more lagged when the flow velocity is decreased when the flow velocity is increased, for example, there is encountered a problem that sufficient effects can not be obtained in a pulsation signal on which higher harmonics are superimposed.

SUMMARY OF THE INVENTION

In the light of the foregoing, the present invention has been made in order to solve the above-mentioned problem associated with the prior art, and it is, therefore, an object of the present invention to provide a heat sensitive flow meter which is capable of, when an intake air pulsation of an engine is generated, reducing an error appearing between a mean flow rate calculated from a flow meter and an actual mean flow rate, and a fuel controller using the same.

With the above object(s) in view, a heat sensitive flow meter according to the present invention for measuring a flow rate of a fluid passing through a suction pipe provided in an internal combustion engine, includes: a filter means for inputting a flow rate signal outputted from a flow rate detection means installed within the suction pipe and subjecting the flow rate signal to a filter processing; and a selection means for comparing the flow rate signal outputted from the flow rate detection means and a filter signal outputted from the filter means to select the signal having a higher voltage from the flow rate signal and the filter signal as a new flow rate signal.

In the present invention, the flow rate signal outputted from the flow rate detection unit and the filter signal outputted from the filter unit are compared with each other in order to select the signal having a larger amplitude as a new flow rate signal. Hence, it is possible to suppress a phenomenon of output reduction of the flow meter occurring due to an influence of an engine pulsation or the like to further increase the amplitude of the output signal, and it is also possible to further reduce an error appearing between an amount of actual intake air of an engine and an output signal of the flow meter.

DESCRIPTION OF THE PREFERRED EMBODIMENTS

Embodiment 1

Embodiment 1 of the present invention will hereinafter be described with reference to FIG. 1. A flow meter of the present invention is a heat sensitive flow meter for detecting a flow rate of a fluid using a heat sensitive resistor. That is to say, the flow meter is constructed such that a flow rate detection unit is installed within a flow tube provided in an internal combustion engine of an automobile or the like in order to detect a flow rate or a flow velocity of a fluid passing through the flow tube on the basis of a phenomenon of heat transfer from a heating element of the flow rate detection unit, measuring a flow rate of a fluid such as an amount of intake air, to a fluid as an object of measurement.

Figure 1:
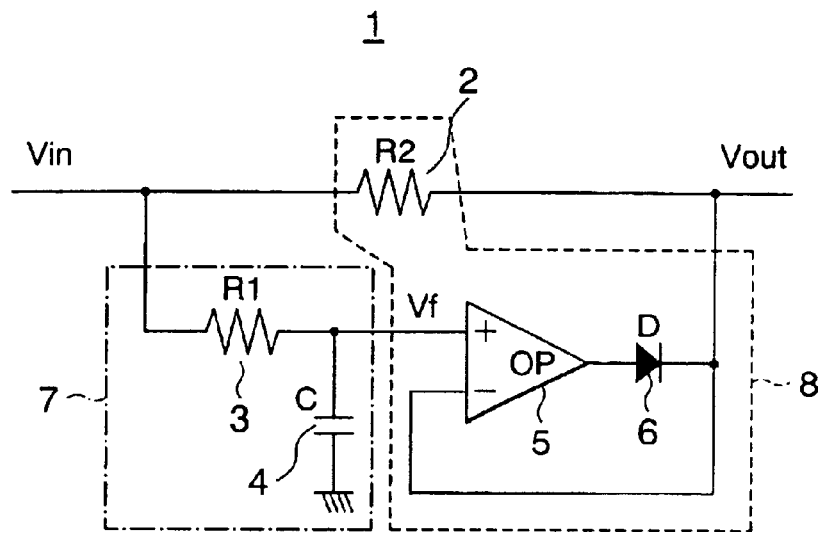
FIG. 1 is a circuit diagram showing a configuration of a heat sensitive flow meter according to Embodiment 1 of the present invention.
Figure 13:
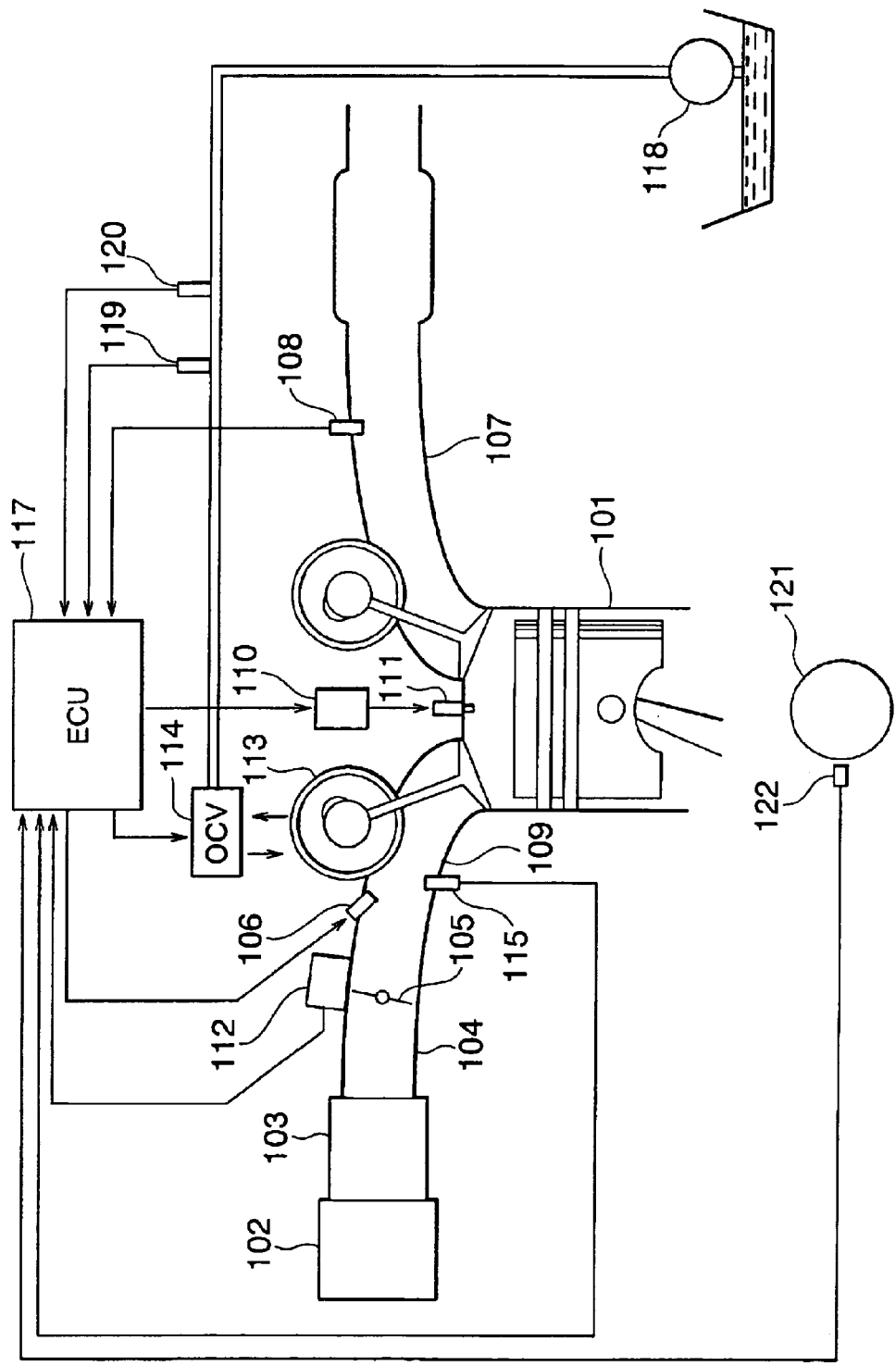
FIG. 13 is a schematic view showing one example of a construction of an internal combustion engine to which the heat sensitive flow meter according to the present invention is applied.

Before giving a description with reference to FIG. 1, first of all, a description is given with respect to one example of the whole construction of an internal combustion engine to which the heat sensitive flow meter according to the present invention is applied with reference to FIG. 13. As shown in FIG. 13, an engine 101 is provided with an air cleaner 102 for cleaning air which is sucked by the engine 101 through a suction pipe 104, as will be described later, for intaking air, and an air flow sensor 103 for measuring an amount of intake air passed through the air cleaner 102. The air flow sensor 103 is a flow rate detection unit in a heat sensitive rate meter of the present invention. The suction pipe 104 is provided with a throttle valve 105. The throttle valve 105 serves to adjust an amount of intake air to control an output of the engine 101. The throttle valve 105 is provided with a throttle aperture sensor 112 for detecting a throttle aperture. In addition, a branched intake manifold 109 is provided downstream with respect to the throttle valve 105. The intake manifold 109 is provided with an injector 106. The injector 106 serves to supply fuel corresponding to an amount of intake air. In addition, the suction valve 104 is also provided with a pressure sensor 115 for detecting an intake manifold pressure within the intake manifold 109. In addition, a sparking plug 111 for generating a spark with which a mixed gas within a combustion chamber is burnt, and a sparking coil 110 for supplying a high voltage energy to the sparking plug 111 are provided in the upper portion of the engine 101. Also, an exhaust pipe 107 for discharging therethrough a burnt exhaust gas is provided on a side opposite to the suction pipe 104. The exhaust pipe 107 is provided with an oxygen ($O_2$) sensor 108 for detecting an amount of remaining oxygen within the exhaust gas. A sensor plate 121 for detecting a crank angle is provided in a lower portion of the engine 101. The sensor plate 121 is provided with a projection (not shown) in its predetermined position, and is mounted to a crank shaft to be rotated in a body with the crank shaft. The sensor plate 121 is provided with a rotation sensor 122. The rotation sensor 122 serves to detect a position of the crank shaft to detect the number of revolutions of the engine. That is to say, the rotation sensor 122 is adapted to generate a signal at the time when the projection (not shown) of the sensor plate 121 has crossed the rotation sensor 122 to thereby detect the number of revolutions of the engine. Actuators (valve timing adjustment units) 113 are provided in an outlet portion of the suction pipe 104 and an inlet portion of the exhaust pipe 107, respectively. The actuators 113 serve to change a relative angle of a cam shaft with respect to the crank shaft. An oil control valve (hereinafter referred to as an "OCV" for short) 114 serves to adjust a supply oil pressure to the cam phase actuator 113 to control a relative angle (cam phase) of the cam shaft with respect to the crank shaft. In addition, an oil pump 118 generates an oil pressure at which the cam phase actuator 113 is driven and also sends labricating oil in mechanism elements of the engine 101 to corresponding portions under pressure. Also, an oil passing tube for the oil concerned is provided with an oil pressure sensor 119 for detecting the oil pressure concerned, and an oil temperature sensor 120 for detecting an oil temperature. An ECU 117 receives input detection values from the various kinds of sensors to carry out control on the basis of the detection values. The internal combustion engine has been described above. Now, a description is returned back to a circuit diagram of FIG. 1.

FIG. 1 is one example of a circuit diagram showing a configuration of a heat sensitive flow meter according to Embodiment 1 of the present invention. An illustrated circuit 1 is connected to a general heat sensitive flow meter (hereinafter referred to as a "flow rate detection unit", and its illustration is omitted here) shown in JP 62-36522 B or the like. Then, the circuit 1 shown in FIG. 1 constitutes, together with the flow rate detection unit, a heat sensitive flow meter of the present invention. Note that, in other embodiments described later as well, the flow rate detection unit will not be illustrated, and only a circuit portion according to the present invention will be described. As shown in FIG. 1, in the circuit 1 according to the present invention, a fixed resistor 2 and other portion are connected in parallel with each other. Here, other portion means a circuit including a fixed resistor 3, a capacitor 4, an operational amplifier 5, and a diode 6. Note that, the circuit 1 shown in FIG. 1 of the present invention receives as its input a voltage value Vin of a flow rate signal outputted from the flow rate detection unit concerned (hereinafter referred to as a "flow rate signal Vin" for short) to output an output signal Vout. At that, the fixed resistor 3 and the capacitor 4 constitute a low-pass filter (LPF) 7 (hereinafter referred to as a "filter 7" for short) for delaying the flow rate signal by a predetermined time constant.

Accordingly, as shown in the figure, the flow rate signal Vin obtained from the flow rate detection unit branches into two systems of a signal passing through the fixed resistor 2 and a signal passing through the circuit constituted by the filter 7 (constituted by the fixed resistor 3 and the capacitor 4), the operational amplifier 5 and the diode 6. At this time, when an electrostatic capacity of the capacitor 4 is assigned C, and a resistance value of the fixed resistor 3 is assigned R1, a signal Vf which has passed through the filter 7 becomes a signal which is obtained by delaying the flow rate signal Vin by a time constant $\tau = C \times R1$. Though the flow rate signal Vin and the signal Vf are equal in frequency to each other, an amplitude of the signal Vf is smaller than that of the flow rate signal Vin (refer to FIG. 2).

After the signal Vf has passed through an ideal diode constituted by the operational amplifier 5 and the diode 6, the signal Vf meets the flow rate signal Vin which has passed through the fixed resistor 2. Hence, for the output signal Vout, the signal having a higher voltage of the flow rate signal Vin and the signal Vf is selected on the basis of an operation of the operational amplifier 5, the diode 6 and the fixed resistor 2.

In such a manner, in this embodiment, the filter 7 (constituted by the capacitor 4 and the fixed resistor 3) constitutes a filter unit for receiving as its input the flow rate signal Vin outputted from the flow rate detection unit to subject the flow rate signal Vin to a predetermined processing. Also, the operational amplifier 5, the diode 6 and the fixed resistor 2 constitute a selection unit 8 for comparing voltages (or flow rate voltages) of the flow rate signal Vin and the signal Vf passed through the filter 7 to select the signal having the higher voltage value as a new flow rate signal.

Figure 2:
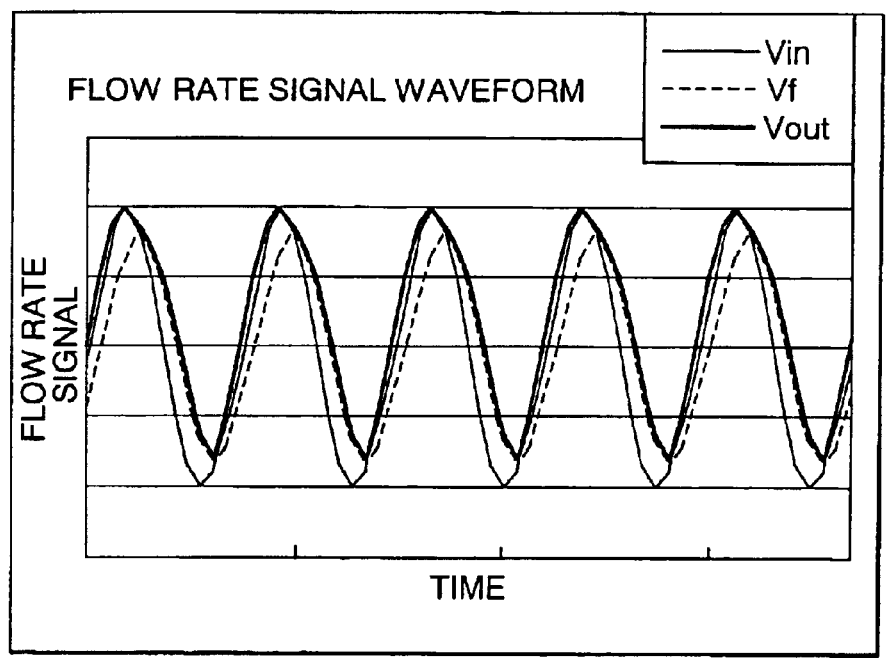
FIG. 2 is a waveform chart useful in explaining signal waveforms in the heat sensitive flow meter according to Embodiment 1 of the present invention.

FIG. 2 shows signal waveforms of the flow rate signal Vin, the output signal Vf and the signal Vout in which a fine line represents the signal Vin, a broken line represents the signal Vf, and a heavy line represents the output signal Vout. As apparent from this figure as well, for the output signal Vout, the signal having the higher voltage value of the signal Vin and the signal Vf is selected. More specifically, while the voltage of the flow rate signal is increased, the flow rate signal Vin is continuously selected as the output signal Vout. While the voltage of the flow rate signal is decreased, the signal Vin is continuously selected as the signal Vout until a time point when the signal Vf and the signal Vin cross each other. Also, the signal Vf is continuously selected as the signal Vout at and after that time point.

As described above, according to the present invention, apart of the flow rate signal outputted from the flow rate detection unit is made to pass through the filter 7, and the signal having the higher voltage, in the signal waveforms before and after passing through the filter 7, of the two signals is used as a new flow rate signal Vout. Hence, a phenomenon of reduction in an amplitude of an output signal of a flow meter occurring due to an influence of an engine pulsation or the like can be suppressed to increase the amplitude of the output signal, and it is possible to reduce an error appearing between an actual amount of intake air of the engine and data on the output signal of the flow meter. Note that, in case of the configuration of Embodiment 1, since the circuit 1 is constituted by the fixed resistors 2 and 3, the capacitor 4, the operational amplifier 5 and the diode 6, the circuit 1 can be configured at a relatively low cost.

Embodiment 2

Figure 3:
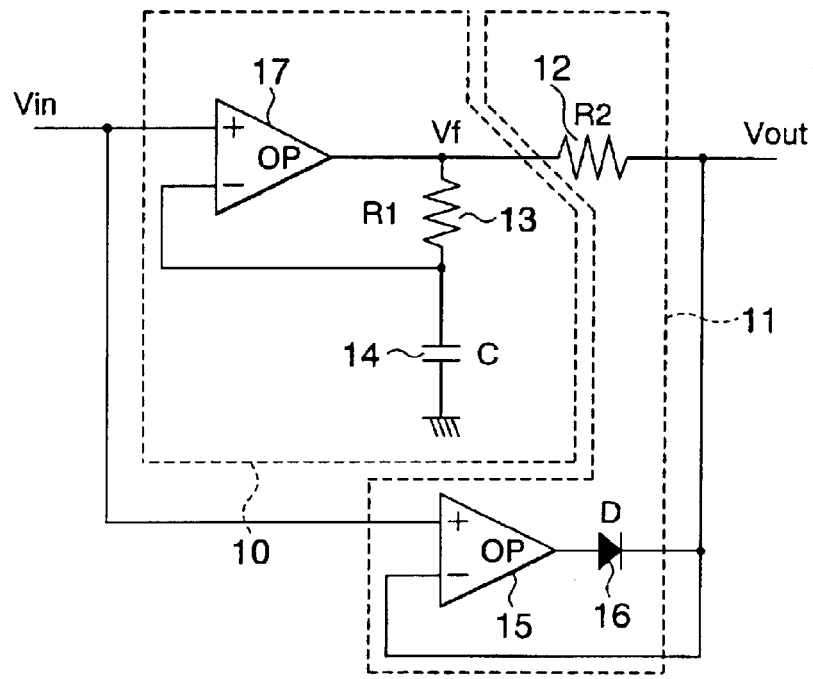
FIG. 3 is a circuit diagram showing a configuration of a heat sensitive flow meter according to Embodiment 2 of the present invention.

A configuration of a heat sensitive flow meter according to Embodiment 2 of the present invention is shown in FIG. 3. FIG. 3 is one example of a circuit diagram embodying the present invention. As shown in the figure, in this embodiment, a filter 10 and a fixed resistor 12 are connected in parallel with an operational amplifier 15 and a diode 16. The filter 10 is a high-pass filter (HPF) constituted by an operational amplifier 17, a fixed resistor 13, and a capacitor 14. While in the above-mentioned Embodiment 1, for a filter configuration, the LPF is adopted, in this embodiment, as shown in FIG. 3, the HPF is adopted. Note that, the circuit of FIG. 3 receives as its input the flow rate signal Vin outputted from the flow rate detection unit to output the output signal Vout.

In this embodiment, as shown in the figure, the flow rate signal Vin obtained from the flow rate detection unit branches into two systems of a signal passing through the filter 10 (constituted by the operational amplifier 17, the fixed resistor 13, and the capacitor 14) and the fixed resistor 12, and a signal passing through an ideal diode constituted by the operational amplifier 15 and the diode 16. At this time, when an electrostatic capacity of the capacitor 14 is assigned C, and a resistance value of the fixed resistor 13 is assigned R1, a signal Vf which has passed through the filter 10 becomes a signal which is obtained by advancing the flow rate signal Vin by a time constant $\tau = C \times R1$. Though the flow rate signal Vin and the signal Vf are equal in frequency to each other, an amplitude of the signal Vf is larger than that of the flow rate signal Vin (refer to FIG. 4).

After passing through the fixed resistor 12, the signal Vf meets the flow rate signal Vin which has passed through an ideal diode constituted by the operational amplifier 15 and the diode 16. Hence, for the output signal Vout, the signal having a higher voltage of the flow rate signal Vin and the signal Vf is selected on the basis of an operation of the fixed resistor 12, the operational amplifier 15, and the diode 16. In such a manner, in this embodiment, the filter 10 constitutes a filter unit for receiving as its input the flow rate signal Vin outputted from the flow rate detection unit to subject the flow rate signal Vin to a predetermined processing. Also, the fixed resistor 12, the operational amplifier 15, and the diode 16 constitute a selection unit 11 for comparing voltages (or flow rate voltages) of the flow rate signal Vin and the signal Vf passed through the filter 10 to select the signal having the higher voltage value as a new flow rate signal.

Figure 4:
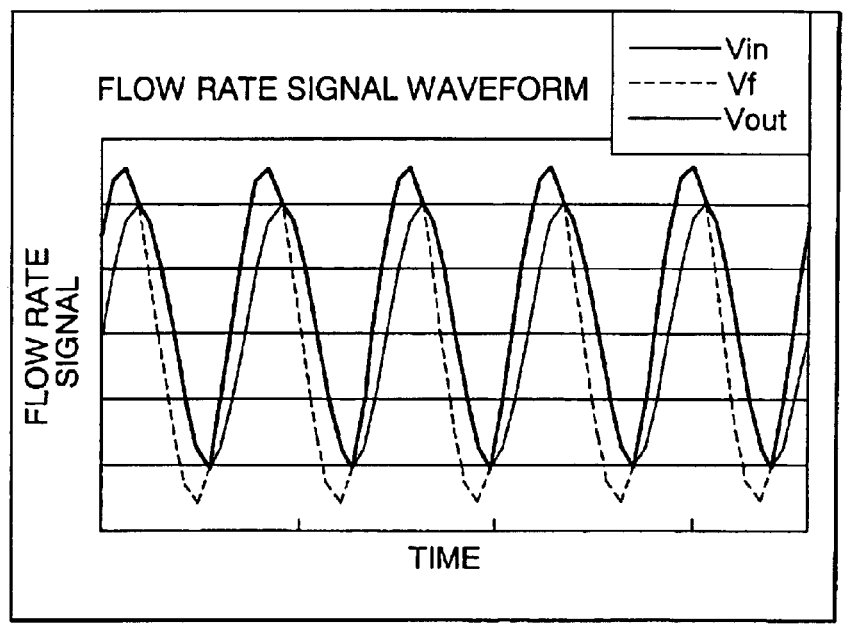
FIG. 4 is a waveform chart useful in explaining signal waveforms in the heat sensitive flow meter according to the Embodiment 2 of the present invention.

FIG. 4 shows signal waveforms of the flow rate signal Vin, the output signal Vf, and the signal Vout in which a fine line represents the signal Vin, a broken line represents the signal Vf, and a heavy line represents the output signal Vout. As apparent from this figure as well, for the output signal Vout, the signal having the higher voltage value of the signal Vin and the signal Vf is selected. More specifically, while the voltage of the flow rate signal is increased, the signal Vf is continuously selected as the output signal Vout from a time point when the signal Vf and the signal Vin cross each other until the signal Vf reaches its peak value. While the voltage of the flow rate signal is decreased, the signal Vf is continuously selected as the signal Vout until a time point when the signal Vf and the signal Vin cross each other. Also, the signal Vin is continuously selected as the signal Vout until a time point when the signal Vf and the signal Vin cross each other.

In this way, in Embodiment 2, a signal having a higher voltage between the flow rate signal Vin and the signal Vf is selected as a signal Vout in the same manner as in Embodiment 1.

As described above, according to the present invention, a part of the flow rate signal outputted from the flow rate detection unit is made to pass through the filter 10, and the signal having the higher voltage, in the signal waveforms before and after passing through the filter 10, of the two signals is used as a new flow rate signal Vout. Hence, a phenomenon of reduction of an amplitude of an output signal of a flow meter occurring due to an influence of an engine pulsation or the like can be suppressed to increase the amplitude of the output signal, and it is possible to reduce an error appearing between an amount of actual intake air of the engine and data of the output signal of the flow meter. Further, according to this embodiment, a delayed flow rate signal is advanced, so that there is an effect such that superficial responsibility is enhanced.

Embodiment 3

Figure 5:
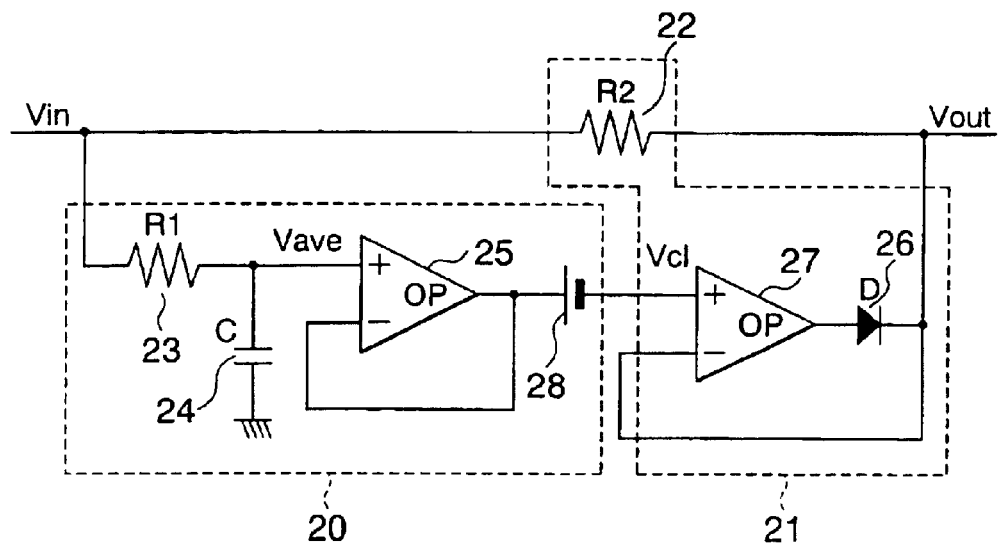
FIG. 5 is a circuit diagram showing a configuration of a heat sensitive flow meter according to Embodiment 3 of the present invention.

FIG. 5 is one example of a circuit diagram showing a configuration of a heat sensitive flow meter according to Embodiment 3 of the present invention. As shown in the figure, a circuit including a filter 20, an operational amplifier 27, and a diode 26 is connected in parallel with a fixed resistor 22. The filter 20 is constituted by a fixed resistor 23, a capacitor 24, an operational amplifier 25, and a battery 28. Note that, the circuit of the present invention receives as its input the flow rate signal Vin outputted from the flow rate detection unit to output the output signal Vout.

Consequently, as shown in the figure, the flow rate signal Vin obtained from the flow rate detection unit branches into two systems of a signal passing through the fixed resistor 2 and a signal passing through the circuit constituted by the filter 20 (constituted by the fixed resistor 23, the capacitor 24, the operational amplifier 25, and the battery 28), the operational amplifier 27, and the diode 26. At this time, when an electrostatic capacity of the capacitor 24 is assigned C, and a resistance value of the fixed resistor 23 is assigned R1, a signal Vave which has passed through the filter constituted by the capacitor 24 and the fixed resistor 23 becomes a signal which is obtained by delaying the flow rate signal Vin by a time constant $\tau = C \times R1$. After the signal Vave has passed through the operational amplifier 25, a predetermined voltage Vc1 is subtracted from the voltage of the signal Vave in the battery 28. Then, the signal Vave passes through an ideal diode constituted by the operational amplifier 27 and the diode 26, and then meets the flow rate signal Vin which has passed through the fixed resistor 22.

In such a manner, with the configuration of FIG. 5, a value lower than the mean value Vave of the flow rate signal by the predetermined value Vc1 previously set is clipped, whereby when a signal having a pulsation amplitude becomes a signal having a voltage value exceeding the clip value, an apparent mean flow rate can be increased. In such a manner, in this embodiment, the filter 20 constitutes a filter unit for receiving as its input the flow rate signal Vin outputted from the flow rate detection unit to subject the flow rate signal Vin concerned to the predetermined processing (the processing for arithmetically operating the value lower than the mean value of the flow rate signal by the predetermined value). Also, the fixed resistor 22, the operational amplifier 27 and the diode 26 constitute selection unit for comparing the voltage values (or the flow rate values) of the flow rate signal Vin and the signal Vf passed through the filter unit and selecting the signal having the larger value as a new flow rate signal.

Figure 6:
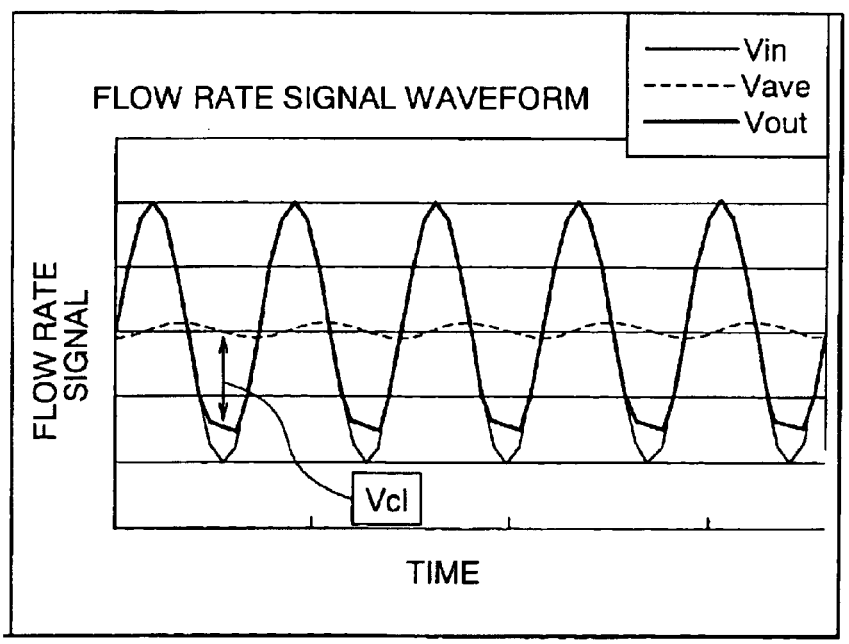
FIG. 6 is a waveform chart useful in explaining signal waveforms in the heat sensitive flow meter according to the Embodiment 3 of the present invention.

FIG. 6 shows signal waveforms of the flow rate signal Vin, the mean value signal Vave, and the output signal Vout in which a fine line represents the signal Vin, a broken line represents the signal Vave of the flow rate signal, and a heavy line represents the signal Vout. As apparent from the figure as well, for the output signal Vout, a value lower than the mean value Vave by the predetermined value Vc1 is set as a limit value. At the time when the amplitude of the flow rate signal has become equal to or lower than the set value concerned, the output signal Vout at this time point is set as the signal (Vave−Vc1). That is to say, the signal having the higher voltage of the flow rate signal Vin and the signal (Vave−Vc1) is selected as the output signal Vout.

Figure 7:
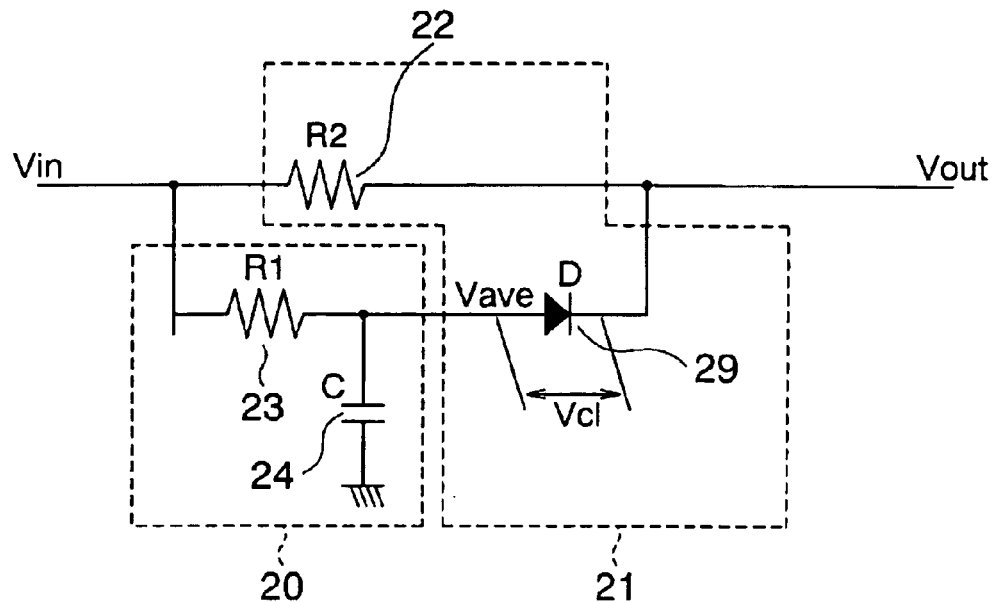
FIG. 7 is a circuit diagram showing a modification of the configuration of the heat sensitive flow meter according to Embodiment 3 of the present invention.

In addition, the configuration of this embodiment may be simplified as shown in FIG. 7. In a configuration of FIG. 7, a diode 29 is provided instead of the operational amplifier 25, the battery 28, the operational amplifier 27, and the diode 26 in the configuration of FIG. 5. The mean value Vave of the flow rate signal is obtained through the fixed resistor 23 and the capacitor 24, and the signal (Vave−Vc1) is obtained on the basis of a function of the diode 29. As a result, it is possible to obtain the signal waveforms of the flow rate signal Vin, the mean value signal Vave and the output signal Vout similar to those shown in FIG. 6. Note that, in this case, the filter 20 including the fixed resistor 23 and the capacitor 24 constitute the filter unit, and the fixed resistor 22 and the diode 29 constitute a selection unit 21.

Figure 8:
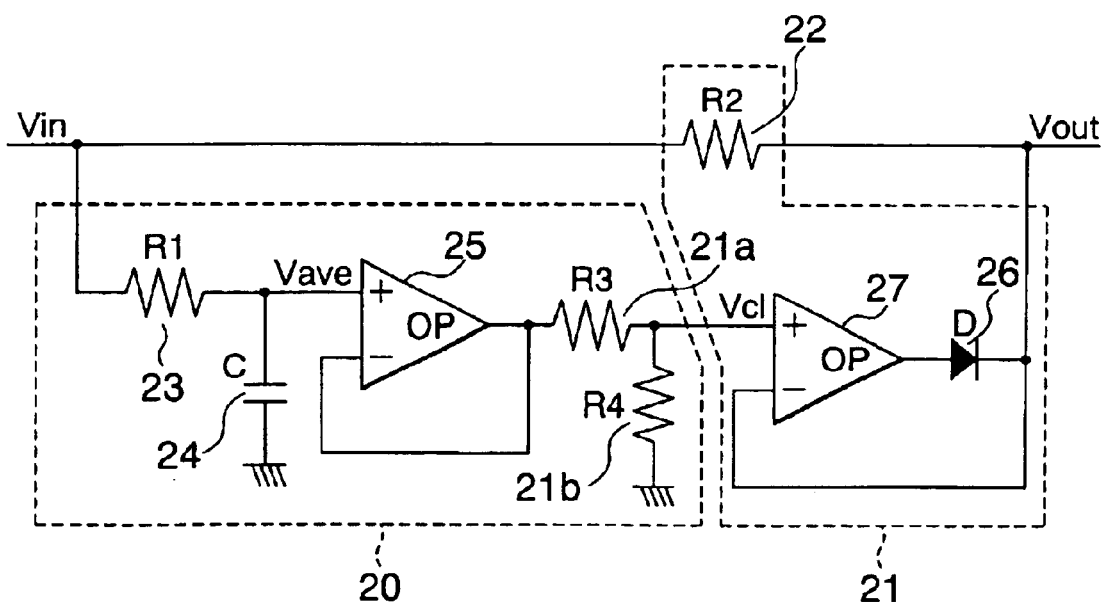
FIG. 8 is a circuit diagram showing another modification of the configuration of the heat sensitive flow meter according to Embodiment 3 of the present invention.

In addition, if the circuit is configured as shown in FIG. 8, a value lower than the mean value of the flow rate signal by a predetermined ratio previously set can be clipped from the mean value of the flow rate signal. That is to say, in the configuration of FIG. 8, two fixed resistors 21*a* and 21*b* are provided instead of the battery 28 in the configuration of FIG. 5. A desired predetermined ratio (R3/R4) can be obtained depending on how to set resistance values R3 and R4 of the two fixed resistors 21*a* and 21*b*. Note that, in this case, the filter 20 including the fixed resistor 23, the capacitor 24, the operational amplifier 25, the fixed resistor 21*a* and the fixed resistor 21*b* constitute the filter unit, and the fixed resistor 22, the operational amplifier 27 and the diode 26 constitute the selection unit 21.

In such a manner, in the configuration of FIG. 8, a value of (Vave×(R3/R4)) lower than the mean value Vave of the flow rate signal by a predetermined ratio previously set is clipped, whereby at the time when a signal having a pulsation amplitude has become a signal having an amplitude exceeding the clip value, an apparent mean flow rate can be increased. That is to say, the signal having the higher voltage of the flow rate signal Vin and the signal (Vave−Vave×(R3/R4)) is selected.

As described above, according to the present invention, a part of the flow rate signal outputted from the flow rate detection unit is made to pass through the filter 20, and the signal having the higher voltage, in the signal waveforms before and after passing through the filter 20, of the two signals is used as a new flow rate signal Vout. Hence, a phenomenon of reduction of an amplitude of an output signal of a flow meter occurring due to an influence of an engine pulsation or the like can be suppressed to increase the amplitude of the output signal, and it is possible to reduce an error appearing between an amount of actual intake air of the engine and data of the output signal of the flow meter. Further, according to Embodiment 3, signal correction is performed only when the pulsation amplitude is large. Thus, there is an effect that characteristics of the flow meter achieved in prior art can be utilized.

Embodiment 4

Figure 9:
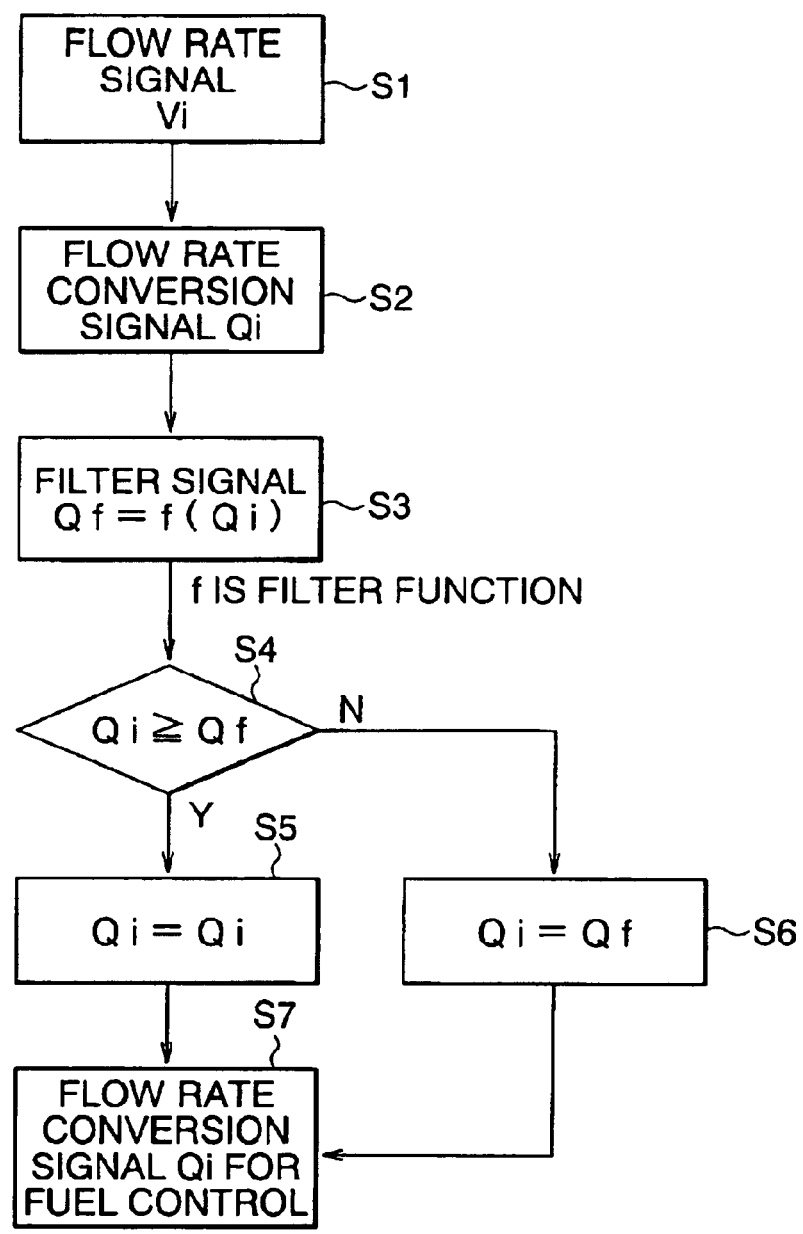
FIG. 9 is a flow chart showing a flow of processings in a heat sensitive flow meter according to Embodiment 4 of the present invention.
Figure 10:
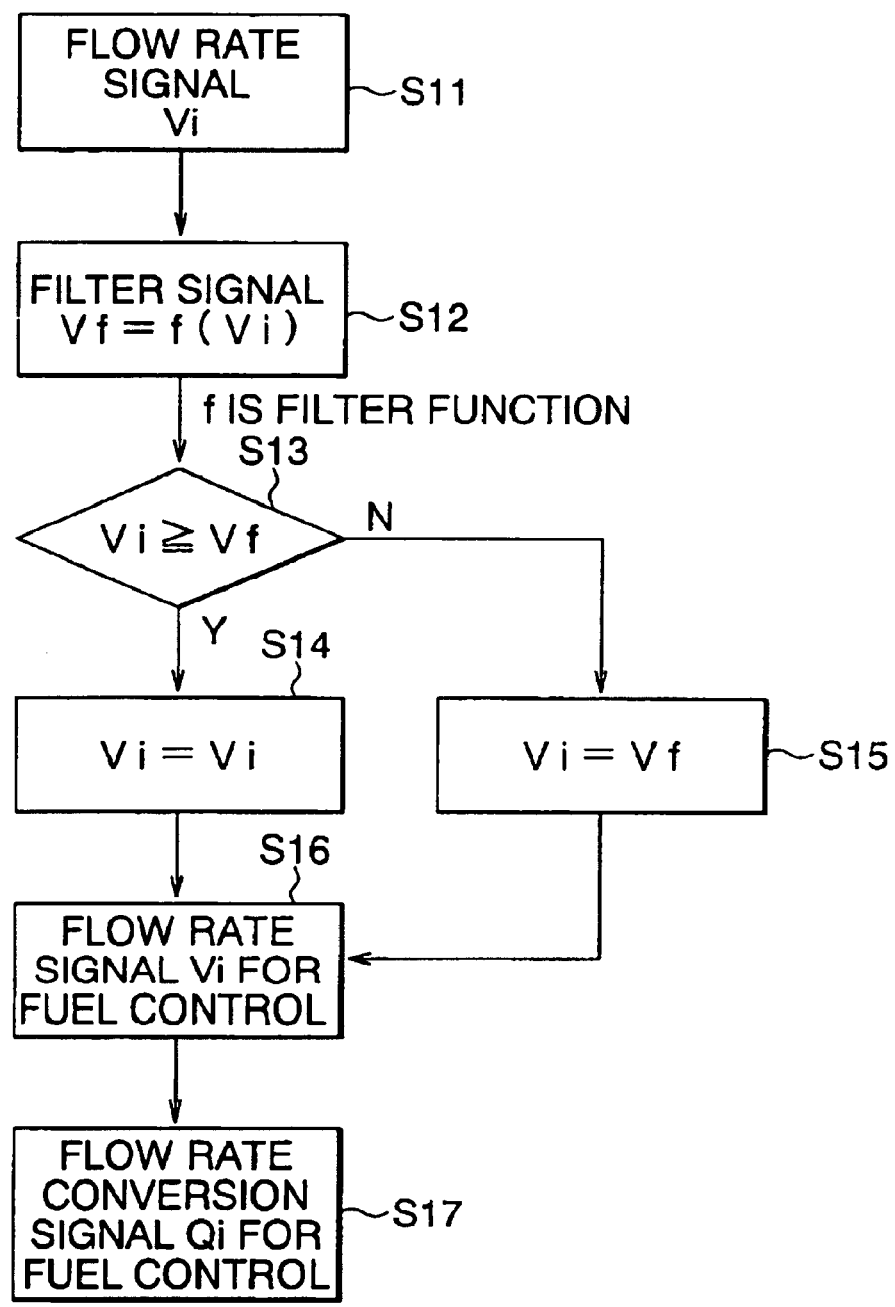
FIG. 10 is a flow chart showing a modification of the flow of the processings in the heat sensitive flow meter according to Embodiment 4 of the present invention.
Figure 11:
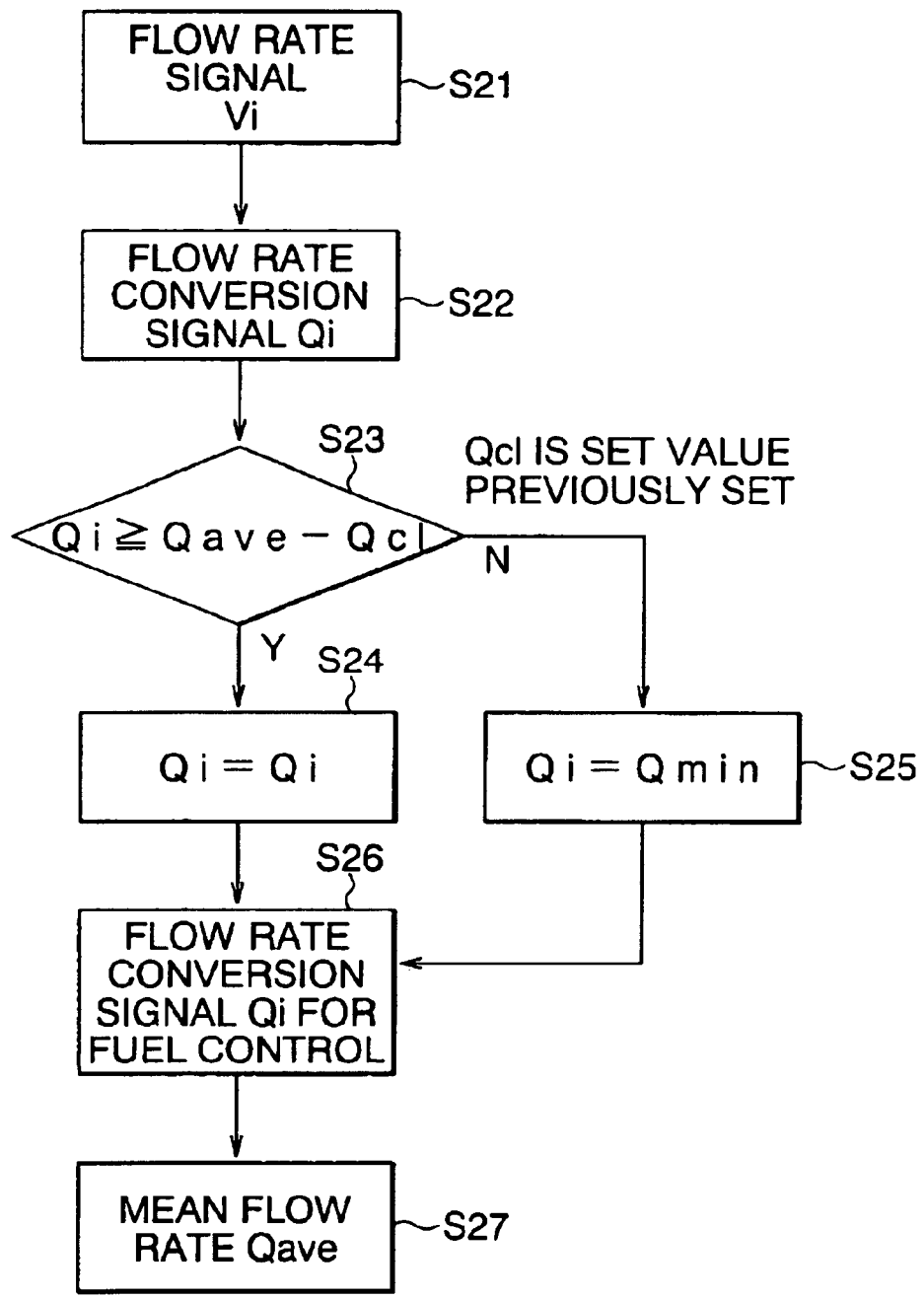
FIG. 11 is a flow chart showing another modification of the flow of the processings in the heat sensitive flow meter according to Embodiment 4 of the present invention.

In the above-mentioned Embodiments 1 to 3, the description has been given with respect to the example in which the phenomenon of reduction of the amplitude of the output signal from the flow meter occurring due to the influence of the engine pulsation or the like is suppressed to increase the amplitude of the output signal on the basis of the circuit configuration. However, in this embodiment, a description will now be given with respect to an example of executing the same processing with a processing using software. FIGS. 9, 10 and 11 are flow charts each showing a flow of a software processing in this embodiment.

The processing shown in FIG. 9 is such that a signal inputted from the flow rate detection unit to a fuel controller is processed using software. In FIG. 9, Vi is a flow rate signal outputted from the flow rate detection unit, Qi is a flow rate conversion signal which is obtained by flow rate-converting the flow rate signal Qi, and Qf is a filter signal which is obtained by filter-processing the flow rate conversion signal Qi.

In the processings of FIG. 9, first of all, in Step S, the flow rate signal Vi detected by the flow rate detection unit is inputted. Next, in Step S2, the inputted flow rate signal Vi is converted into the flow rate conversion signal Qi as a signal exhibiting a flow rate of a fluid. Next, in Step S3, the flow rate conversion signal Qi is subjected to a predetermined filter processing to obtain the filter signal Qf (=f(Qi)) where f is a filter function). Note that, the filter processing concerned is a software processing for obtaining the results corresponding to the results of the processing in the filter 1 or the filter 10 shown in the above-mentioned Embodiment 1 or 2, respectively. That is to say, the signal Qi is delayed or put forward with a predetermined time constant to obtain the signal waveform which is identical in frequency to the signal Qi, but different in amplitude from the signal Qi. Next, in Step S4, the amplitudes of the flow rate conversion signal Qi and the filter signal Qf are compared with each other. When it is judged as a result of the comparison in Step S4 that the amplitude of the flow rate conversion signal Qi is larger than that of the filter signal Qf, the process proceeds to Step S5, and no processing is then especially executed (Qi=Qi). On the other hand, when it is judged as a result of the comparison in Step S4 that the amplitude of the flow rate conversion signal Qi is smaller than that of the filter signal Qf, the process proceeds to Step S6, and a value of the signal Qf is then substituted for the value of the signal Qi (Qi=Qf). As a result, in Step S7, the signal having the larger amplitude of the signal Qi and the signal Qf is used as a new signal Qi as a flow rate conversion signal Qi for fuel control. In such a manner, in FIG. 9, the processings of Steps S1 to S3 constitute the filter unit for receiving as its input the flow rate signal Vin outputted from the flow rate detection unit to subject the flow rate signal Vin to the predetermined processing. Also, the processings of Steps S4 to S7 constitute the selection unit for comparing any ones of the voltage values and the flow rate values of the flow rate signal and the signal passed through the filter unit to select the signal having the larger value as a new flow rate signal.

Note that, as shown in FIG. 10, the flow rate signal Vi before the flow rate conversion may be subjected to the filter processing in order to select the signal having the larger value before and after the filter processing.

In the processings of FIG. 10, first of all, in Step S11, the flow rate signal Vi detected by the flow rate detection unit is inputted. Next, in Step S12, the flow rate signal Vi is subjected to a predetermined filter processing to obtain the filter signal Vf (=f(Vi)) where f is a filter function). Note that, the filter processing concerned is a software processing for obtaining the results corresponding to the results of the processing in the filter 1 or the filter 10 shown in the above-mentioned Embodiment 1 or 2, respectively (that is, signal waveform of the signal Vf shown in shown in FIGS. 2 and 4). Next, in Step S13, the amplitudes of the flow rate signal Vi and the filter signal Vf are compared with each other. When it is judged as a result of the comparison in Step S13 that the amplitude of the flow rate signal Vi is larger than that of the filter signal Vf, the process proceeds to Step S14 and no processing is then especially executed (Vi=Vi). On the other hand, when it is judged as a result of the comparison in Step S13 that the amplitude of the flow rate signal Vi is smaller than that of the filter signal Vf, the process proceeds to Step S15, and a value of the signal Vf is then substituted for the value of the signal Vi (Vi=Vf). Next, in Step S16, the signal having the larger amplitude of the signal Vi and the signal Vf is used as a new signal Vi as a flow rate signal Vi for fuel control. Next, in Step S17, the flow rate of the new flow rate signal Vi is converted into a flow rate conversion signal Qi. Then, the signal having a higher voltage is selected from the signal Vi and the signal Vf as the flow rate signal Vi for fuel control. In such a manner, in FIG. 10, the processings of Steps S11 to S12 constitute the filter unit for receiving as its input the flow rate signal Vi outputted from the flow rate detection unit to subject the flow rate signal Vi to the predetermined processing. Also, the processings of Steps S13 to S17 constitute the selection unit for comparing any ones of the voltage values and the flow rate values of the flow rate signal Vi and the signal Vf passed through the filter unit to select the signal having the larger value as a new flow rate signal.

Note that, as shown in FIG. 11, the value of the flow rate conversion signal may be compared with a value that is lower than the mean flow rate Qave by the flow rate Qc1 previously set to clip the flow rate signal Q1 with the signal (Qave−Qc1) when the voltage value of the signal Qi is equal to or lower than that of the signal (Qave−Qc1). At that, as a result, the same effects as those of the above-mentioned Embodiment 3 can be obtained.

In the processings shown in FIG. 11, first of all, in Step S21, the flow rate signal Vi detected by the flow rate detection unit is inputted. Next, in Step S22, the inputted flow rate signal Vi is converted into the flow rate conversion signal Qi exhibiting the flow rate. Next, in Step S23, the amplitude of the flow rate conversion signal Qi is compared with a value lower than the mean flow rate Qave by the flow rate Qc1 previously set. Note that, the mean flow rate Qave will be previously arithmetically operated to be prepared for the next processings in Step S27 which will be described later. When it is judged as a result of the comparison in Step S23 that the amplitude of the flow rate conversion signal Qi is larger than that value, the process proceeds to Step S24, and no processing is especially executed (Qi=Qi). On the other hand, when it is judged as a result of the comparison in Step S23 that the amplitude of the flow rate conversion signal Qi is smaller than that value, the process proceeds to Step S25, and a value of (Qmin=Qave−Qcl) is substituted for the value of Qi (Qi=Qmin). As a result, in Step S26, the signal having the larger value of the signal Qi and the signal Qmin is used as a new signal Qi as a flow rate conversion signal Qi for fuel control. Next, the mean flow rare Qave is arithmetically operated for the next processings using the present measurement results and the past measurement results. In such a manner, in FIG. 11, the processings for obtaining the signal (Qave−Qc1) in Steps S21 and S22, and Step S23 constitute the filter unit for receiving as its input the flow rate signal Vin outputted from the flow rate detection unit to subject the flow rate signal Vin to the predetermined processing. Also, the processings from the amplitude comparison processing in Step S23 to Step S27 constitute the selection unit for comparing the voltage values (and any ones of the voltage values and the flow rate values) of the flow rate signal Vin and the signal Vf that is passed through the filter 7.

As described above, according to this embodiment, similarly to the above-mentioned Embodiments 1 to 3, the flow rate signal outputted from the flow rate detection unit is subjected to the predetermined software processing, and the signal having the higher voltage in the signal waveforms before and after the software processing is used as a new flow rate signal Vout. As a result, the phenomenon of reduction of the amplitude of the output signal from the flow meter occurring because of the influence of the engine pulsation or the like can be suppressed to increase the amplitude of the output signal, and it is possible to reduce an error appearing between an amount of actual intake air of the engine and the output signal of the flow meter. In addition, according to this embodiment, since the process is carried out by executing the software processing, the flow meter becomes inexpensive.

Embodiment 5

Figure 12:
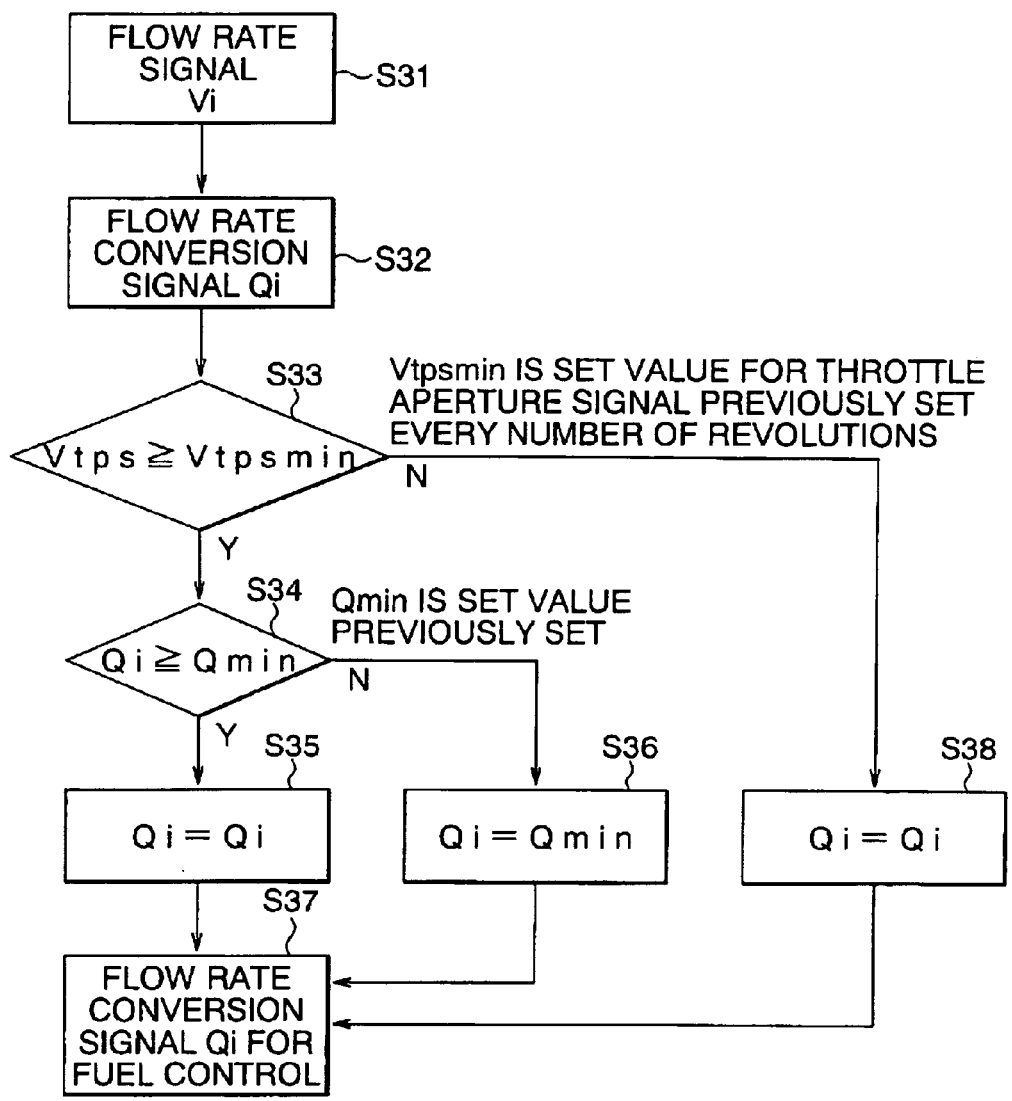
FIG. 12 is a flow chart showing a flow of processings in a heat sensitive flow meter according to Embodiment 5 of the present invention.

In this embodiment as well, similarly to the above-mentioned Embodiment 4, an example of processings using software will herein below be described. FIG. 12 is a flow chart showing a flow of software processings in this embodiment. In general, the aperture of the throttle valve 105 (hereinafter referred to as "the throttle aperture" for short) for adjusting an amount of intake air to the engine 101 is controlled by driving a throttle actuator (not shown) provided for the throttle valve 105 in accordance with the control made by the ECU 117 as a controller provided in the internal combustion engine on the basis of the number of revolutions of the engine 101. Thus, in this embodiment, a set value for the throttle aperture is set every number of revolutions of the engine. When the throttle aperture has become equal to or larger than the set value that is previously set every number of revolutions of the engine, equal to or smaller than the flow rate previously set is clipped.

In the processings shown in FIG. 12, first of all, in Step S31, the flow rate signal Vi detected by the flow rate detection unit is inputted. Next, in Step S32, the inputted flow rate signal Vi is converted into the flow rate conversion signal Qi exhibiting a flow rate. Next, in Step S33, a throttle aperture Vtps detected by the throttle aperture sensor 112 is compared with a predetermined set value Vtpsmin. Note that, the predetermined set value Vtpsmin is a set value for a throttle aperture signal which is previously set in correspondence to the number of revolutions of the engine. For example, a data table is generated to store the set values for the throttle aperture signal in a memory of the ECU in correspondence to the number of revolutions of the engine. Note that, the number of revolutions of the engine, as described with reference to FIG. 13, is detected by the rotation sensor 122. When it is judged as a result of the comparison in Step S33 that the throttle aperture Vtps is larger than the predetermined set value Vtpsmin, the process proceeds to Step S34. On the other hand, when it is judged as a result of the comparison in Step S33 that the throttle aperture Vtps is smaller than the predetermined set value Vtpsmin, the process proceeds to Step S38, and no processing is especially executed (Qi=Qi), and then the process proceeds to Step S37. In Step S34, the amplitude of the flow rate conversion signal Qi obtained in Step S32 is compared with a predetermined value Qmin. The predetermined value Qmin is suitably set to a suitable value with the method in the above-mentioned Embodiment 4 as one example. When it is judged as a result of the comparison in Step S34 that the amplitude of the flow rate conversion signal Qi is larger than the predetermined set value Qmin, the process proceeds to Step S35, and no processing is especially executed (Qi=Qi). On the other hand, when it is judged as a result of the comparison in Step S34 that the amplitude of the flow rate conversion signal Qi is smaller than the predetermined set value Qmin, the process proceeds to Step S36, and the predetermined set value Qmin is substituted for the value of the flow rate conversion signal Qi (Qi=Qmin). Accordingly, when in Step S37, the throttle aperture has become equal to or larger than a predetermined value for the flow rate conversion signal Qi for fuel control, the signal having the larger value of the signal Qi and the signal Qmin is used as a new signal Qi. As a result, when the throttle aperture has become equal to or larger than the set value for the throttle aperture which is previously set every number of revolutions of the engine, it is possible to clip equal to or smaller than the flow rate previously set.

Note that, in this embodiment, Step S33 constitutes a judgement step of inputting a value of the throttle aperture and a value of the number of revolutions of the engine to judge whether or not the throttle aperture is equal to or larger than the set value for the throttle aperture which is previously set in correspondence to the number of revolutions. Also, Steps S34 to S37 constitute a selection step of, when the throttle aperture is equal to or larger than the set value, judging whether or not the amplitude of the flow rate signal outputted from the flow rate detection unit installed within the suction pipe is equal to or smaller than a set value for the flow rate signal previously set to select the set value as a new flow rate signal if the amplitude of the flow rate signal is judged to be equal to or smaller than the set value.

As described above, according to this embodiment, similarly to the above-mentioned Embodiment 4, the flow rate signal outputted from the flow rate detection unit is subjected to the predetermined software processing, and the signal having the higher voltage in the signal waveforms before and after the software processing is used as a new flow rate signal Vout. As a result, the phenomenon of reduction of the amplitude of the output signal from the flow meter occurring because of the influence of the engine pulsation or the like can be suppressed to increase the amplitude of the output signal. It is also possible to reduce an error appearing between an amount of actual intake air of the engine and the output signal of the flow meter. In addition, according to this embodiment, since the process is carried out by executing the software processing, similarly to the Embodiment 4, the flow meter becomes inexpensive. Moreover, in this embodiment, since the clip value can be set every number of revolutions of the engine, a degree of freedom of the engine is increased. Furthermore, since a region in which no error of the flow meter appears due to the engine pulsation can be set with the throttle aperture, it is possible to maintain the fuel accuracy achieved in prior art.

Note that, in this embodiment, the description has been given with respect to the example in which when the throttle aperture becomes equal to or larger than the throttle aperture that is previously set every number of revolutions, equal to or smaller than the predetermined flow rate is clipped. However, the present invention is not intended to be limited to that example, and an intake manifold pressure may be used. In general, a pressure within the intake manifold 109, serving as a suction pressure in the suction pipe 104 provided downstream with respect to the throttle valve 105 (hereinafter referred to as "an intake manifold pressure" for short) is controlled by adjusting the throttle aperture with the ECU 117 on the basis of the number of revolutions of the engine. For this reason, as a modification of this embodiment, a set value for the intake manifold pressure is previously set every number of revolutions of the engine. Then, when the intake manifold pressure detected by the pressure sensor 115 provided in the intake manifold 109 has become equal to or larger than the set value for the intake manifold pressure previously set every number of revolutions, equal to or smaller than a predetermined flow rate is clipped. The same effects can be obtained in this case as well.

In addition, when the heat sensitive flow meter described in the above-mentioned Embodiments 1 to 5 is used in a fuel controller for an internal combustion engine of an automobile or the like, since an error appearing between a flow rate of actual intake air of the engine and an output signal of the flow meter is less, the fuel control can be carried out with high accuracy.

What is claimed is:

1. A heat sensitive flow meter for measuring a flow rate of a fluid passing through a pipe provided in an internal combustion engine, comprising:
    a filter for inputting a flow rate signal outputted from a flow rate detector installed within the pipe and subjecting the flow rate signal to a filter processing; and
    a selector for comparing the flow rate signal outputted from the flow rate detector and a filter signal outputted from the filter to select the signal having a higher voltage from the flow rate signal and the filter signal as a new flow rate signal.

2. A heat sensitive flow meter according to claim 1, wherein the filter is comprised of a low-pass filter, and the filter processing is a processing for delaying the flow rate signal with a predetermined time constant.

3. A heat sensitive flow meter according to claim 1, wherein the filter is comprised of a high-pass filter, and the filter processing is a processing for advancing the flow rate signal with a predetermined time constant.

4. A heat sensitive flow meter according to claim 1, wherein the filter processing executed by the filter is a processing for arithmetically operating a value lower than a mean value of the flow rate signal by a predetermined value to output the resultant value.

5. A fuel controller for carrying out fuel control using the heat sensitive flow meter as claimed in claim 1.

6. In a heat sensitive flow meter for measuring a flow rate of a fluid passing through a pipe provided in an internal combustion engine, the improvement comprising: comparing a flow rate signal outputted from a flow rate detection means installed within the pipe and a filter signal obtained by subjecting the flow rate signal to filter processing using a previously set filter function, selecting and the signal having a higher voltage from the flow rate signal and the filter signal as a new flow rate signal.

7. A heat sensitive flow meter according to claim 6, wherein the filter processing is a processing for delaying the flow rate signal with a predetermined time constant.

8. A heat sensitive flow meter according to claim 6, wherein the filter processing is a processing for advancing the flow rate signal with a predetermined time constant.

9. A heat sensitive flow meter according to claim 6, wherein the filter processing is a processing for arithmetically operating a value lower than a mean value of the flow rate signal by a predetermined value to output the resultant value.

10. In a heat sensitive flow meter for measuring a flow rate of a fluid passing through a pipe provided in an internal combustion engine, the improvement comprising:

receiving data on a throttle aperture of the internal combustion engine and data on the number of revolutions of the internal combustion engine, and judging whether or not the throttle aperture is equal to or larger than a set value for the throttle aperture previously set in correspondence to the number of revolutions; and when the throttle aperture is equal to or larger than the set value, judging whether or not a value of a flow rate signal outputted from the flow rate detection means installed within the pipe is equal to or smaller than a set value for a flow rate signal previously set, and selecting the set value as a new flow rate signal when the value of the flow rate signal is equal to or smaller than the set value.

11. In a heat sensitive flow meter for measuring a flow rate of a fluid passing through a pipe provided in an internal combustion engine, the improvement comprising:

receiving data on a pressure within the pipe and data on the number of revolutions of the internal combustion engine to judge whether or not the pressure is equal to or larger than a set value for the pressure previously set in correspondence to the number of revolutions; and when the pressure is equal to or larger than the set value, judging whether or not a value of a flow rate signal outputted from a flow rate detection means installed within the pipe is equal to or smaller than a set value for the flow rate signal previously set, and selecting the set value as a new flow rate signal when the value of the flow rate signal is equal to or smaller than the set value.

* * * * *